(12) United States Patent
Ito et al.

(10) Patent No.: US 7,364,227 B2
(45) Date of Patent: Apr. 29, 2008

(54) MOVABLE ROOF OPENING-CLOSING STRUCTURE

(75) Inventors: Yoshiyasu Ito, Tochigi (JP); Hiroyuki Tsukamoto, Tochigi (JP); Akio Kobori, Tochigi (JP); Michio Tamura, Saitama (JP); Akihiko Kuribayashi, Saitama (JP)

(73) Assignees: Yachiyo Kogyo Kabushiki Kaisha, Sayama-shi (JP); Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 11/270,839

(22) Filed: Nov. 10, 2005

(65) Prior Publication Data
US 2006/0119143 A1     Jun. 8, 2006

(30) Foreign Application Priority Data
Nov. 10, 2004   (JP) ............................. 2004-326856
Mar. 11, 2005   (JP) ............................. 2005-068531

(51) Int. Cl.
*B60J 7/00* (2006.01)
(52) U.S. Cl. ........................... 296/216.02; 296/216.03; 296/223
(58) Field of Classification Search ........... 296/216.03, 296/223, 216.02
See application file for complete search history.

(56) References Cited

U.S. PATENT DOCUMENTS
6,568,751 B2 *  5/2003  Reinsch ...................... 296/219
6,962,391 B2 * 11/2005  Tamura ................. 296/216.03

FOREIGN PATENT DOCUMENTS
GB         316810      *  8/1929  ........... 296/216.03
JP      361016126      *  1/1986  ........... 296/216.03
JP       2004-17864       1/2004

* cited by examiner

*Primary Examiner*—Dennis H Pedder
(74) *Attorney, Agent, or Firm*—Kratz, Quintos & Hanson, LLP

(57) ABSTRACT

A movable roof opening-closing structure rotatively opening and closing a movable roof toward backward at an outside of a vehicle body through a linkage equipped with a first link bar and a second link bar, wherein the linkage is configured with an inequilateral four-bar linkage having a fixed bar at a vehicle body side, and wherein an instant center of the movable roof against the vehicle body when the movable roof is at an entirely closing position is located at one of positions where is ahead of a front end of the movable roof and behind of a rear end of the movable roof.

4 Claims, 7 Drawing Sheets

MOVABLE ROOF OPENING-CLOSING STRUCTURE

CROSS REFERENCE TO RELATED APPLICATIONS

This application claims the foreign priority benefit under Title 35, United States Code, §119(a)-(d) of Japanese Patent Applications No. 2004-326856 and 2005-068531, filed on Nov. 10, 2004 and Mar. 11, 2005, respectively, the contents of which are hereby incorporated by reference.

BACKGROUND OF THE INVENTION

1. Technical Field of the Invention

The present invention relates to an opening-closing structure of movable roof for vehicles.

2. Description of the Related Art

Various types of roof opening-closing structure have been proposed for sport utility vehicles. For example, Japanese Laid-open Patent Application No. 2004-17864, (paragraphs [0012] to [0020], and FIGS. 3 and 5) discloses a vehicles having a movable opening-closing structure at outside of the vehicle.

In the Japanese Laid-open Patent Application No. 2004-17864, a four-bar linkage of the roof opening-closing structure has been disclosed. In paragraph [0017], there is a description forgiving a spoiler function to the roof by appropriately selecting the lengths of a pair of the linking members and positions of the linking members attached to the roof. It is an object of the present invention to provide an opening-closing structure of the movable roof, which is, for example, able to give a spoiler function to the roof and has wide freedom regarding a moving trajectory of the roof as well as smooth operation of opening-closing of the roof.

SUMMARY OF THE INVENTION

According to one aspect of the present invention, there is provide a movable roof opening-closing structure rotatively opening and closing the movable roof toward backward at an outside of a vehicle body through a linkage equipped with a first link bar and a second link bar, wherein the linkage is configured with an inequilateral four-bar linkage having a fixed bar at a vehicle body side, and wherein an instant center of the movable roof against the vehicle body when the movable roof is at an entirely closing position is located at one of positions where is ahead of a front end of the movable roof and behind of a rear end of the movable roof.

According to this movable roof opening-closing structure, it is possible to open the movable roof so as to gradually change the posture of the roof. For example, at the opening stage, it is possible to give, so-called, a spoiler function to the roof by declining the movable roof with rear up. And, at the initial stage of opening and at the final stage of closing of the movable roof, since a simultaneous displacement of the front and rear ends of the movable roof upward or downward is available, it becomes possible to smoothly open and close the movable roof without applying any improper force to the front and rear ends of the movable roof.

The present invention may provide a movable roof opening-closing structure in which a tilt angle of a bar of the first link bar and a tilt angle of a bar of the second link bar against the fixed bar are set equal to each other when the movable roof is at entirely opening.

According to the movable roof opening-closing structure described in the above, at the initial stage of opening and at the final stage of closing of the movable roof, the movement of the inequilateral four-bar linkage is similar to that of a parallel linkage. As a result, each displacement direction and each displacement amount of the front and rear ends of the movable roof are the same to each other. Therefore, an improper force is substantially not applied to the front end and the rear end of the movable roof, thereby resulting in smooth opening and closing of it.

According to another aspect of the present invention, there is provided a movable roof opening-closing structure rotatively opening and closing the movable roof toward backward at outside of a vehicle body through a linkage equipped with a first link bar and a second link bar, wherein the linkage is configured with an inequilateral four-bar linkage having a fixed bar at a vehicle body side, and wherein the following relations are satisfied, a<b, and (a+d)>(b+C), and (a+c)>(b+d) among a, b, c, and d, when a length of a bar at the movable roof side is a, a length of the fixed bar is b, a length of the first link bar is c, and a length of the second link bar is d.

By setting the relation a<b among a, b, c, and d, it is possible to prevent from lowering of a rear part of the movable roof and give a spoiler function to it with rear up. In addition, by setting the relation (a+d)>(b+C), so-called, over-center at entirely closing can be prevented. The over-center means that a connecting point between the second link bar and the movable roof goes beyond a point where a bar of the second link bar and a bar at the movable roof side are in straight line when the movable roof is at entirely closing. Further, by setting the relation (a+c)>(b+d), the over-center at entirely opening, where a connecting point between the first link bar and the movable roof goes beyond a point where the bar of the first link bar and the bar at the movable roof side are in straight line when the movable roof is at entirely opening, can be prevented. As a result, entirely opening operation and closing operation from the entirely opening of the movable roof can be smoothly conducted.

Furthermore, the present invention provides a movable roof opening-closing structure, characterized in that the fixed bar is disposed at a bottom edge of a roof periphery of the vehicle body in substantially horizontal direction.

By arranging a fixed bar at the vehicle body side in substantially horizontal direction, from the relation a<b, it becomes easier to set a relation so that a connecting point between the movable roof side and the second link bar moves upward and backward of the vehicle body according to the opening operation of the movable roof.

According to the present invention, it is possible to give, so-called, a spoiler function to a movable roof by declining the movable roof with rear up at the opening, and to smoothly open and close the movable roof. In addition, the over-center can be avoided at entirely opened and entirely closed.

BRIEF DESCRIPTION OF THE DRAWINGS

The aspects of the present invention will become more apparent by describing in detail illustrative, non-limiting embodiments thereof with reference to the accompanying drawings, in which.

DESCRIPTION OF THE PREFERRED EMBODIMENTS

Figure 1:
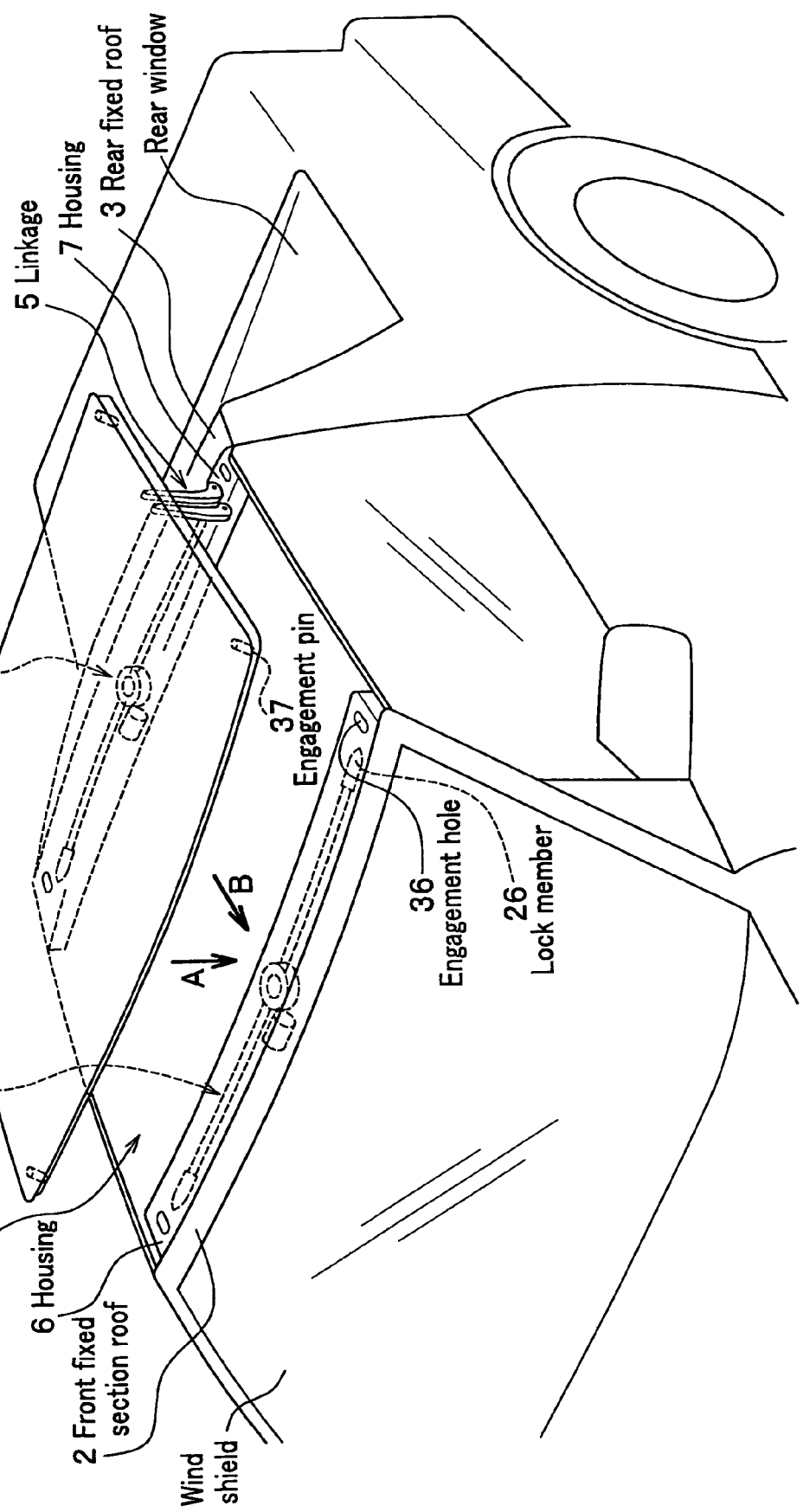
FIG. 1 is a partial external perspective view of a vehicle equipped with a movable roof.

As shown in FIG. 1, opening 4 is formed in a roof and extends between front fixed section roof 2 and rear fixed roof 3 located above the vehicle cabin. When the movable roof (hereinafter, referred to as panel 1) is entirely closed, the opening 4 is closed, and when the movable roof panel is opened, opening 4 is opened by rotatably moving the panel backward through linkage 5 at outside of the vehicle. When panel 1 is entirely opened, a front end of panel 1 is located at around a rear periphery of opening 4, thereby resulting in a status that panel 1 is extended backward and over the rear fixed roof 3 and a rear window. Linkage 5 is arranged at around a periphery on each side of panel 1.

At the front and the rear peripheries of opening 4, housings 6, 7 for housing locking mechanism 15, which will be described later in detail, are extending in the vehicle width direction. Housing 7 at the rear periphery also has a housing function for connecting shafts (connecting shafts 8, 9 in FIG. 2) at a fixed side of linkage 5 and its driving source, that is, a driving source (for example, motor and the like) for opening and closing operation of panel 1.

A brief mechanism of linkage 5 will be explained by referring to FIG. 2. Inside of housing 7 shown in dotted line, connecting shafts 8, 9, both of which have axis directions in the vehicle width direction, are disposed with a given distance in horizontal and anteroposterior directions, respectively. The positions of connecting shafts 8, 9 are fixed against the vehicle body. On the other hand, bracket 10 is attached at the middle of a lower surface of panel 1 in anteroposterior direction. On bracket 10, connecting shafts 11, 12, both of which have axis directions in the vehicle width direction, are disposed with a given distance in anteroposterior direction, respectively. In addition, a line segment which connects connecting shafts 11, 12 is arranged substantially parallel to a surface of panel 1.

And, connecting shaft 8 located ahead of connection shafts 9 and connecting shaft 11 located ahead of connecting shafts 12 are connected with a first link bar 13. Also, connecting shaft 9 and connecting shaft 12 are connected with a second link bar 14, which is arranged at a position displaced in the vehicle width direction against the first link bar 13. Namely, linkage 5 configures a four-bar linkage using a line segment between connecting shafts 8, 9, the first link bar 13, a line segment between connecting shafts 11, 12, and the second link bar 14 as the bars. A bar between connecting shafts 8, 9 is given a role of a fixed bar in linkage 5 among the bars. In the present embodiment, the second link bar 14 has a function, so-called, a driving bar, and the opening and closing of panel 1 is conducted through operation of linkage 5 by giving connecting shaft 9 a function as the driving shaft. Meanwhile, although not shown, for example, a groove is formed on a surface of housing 7 for passing through the first link bar 13 and the second link bar 14.

Figure 2:
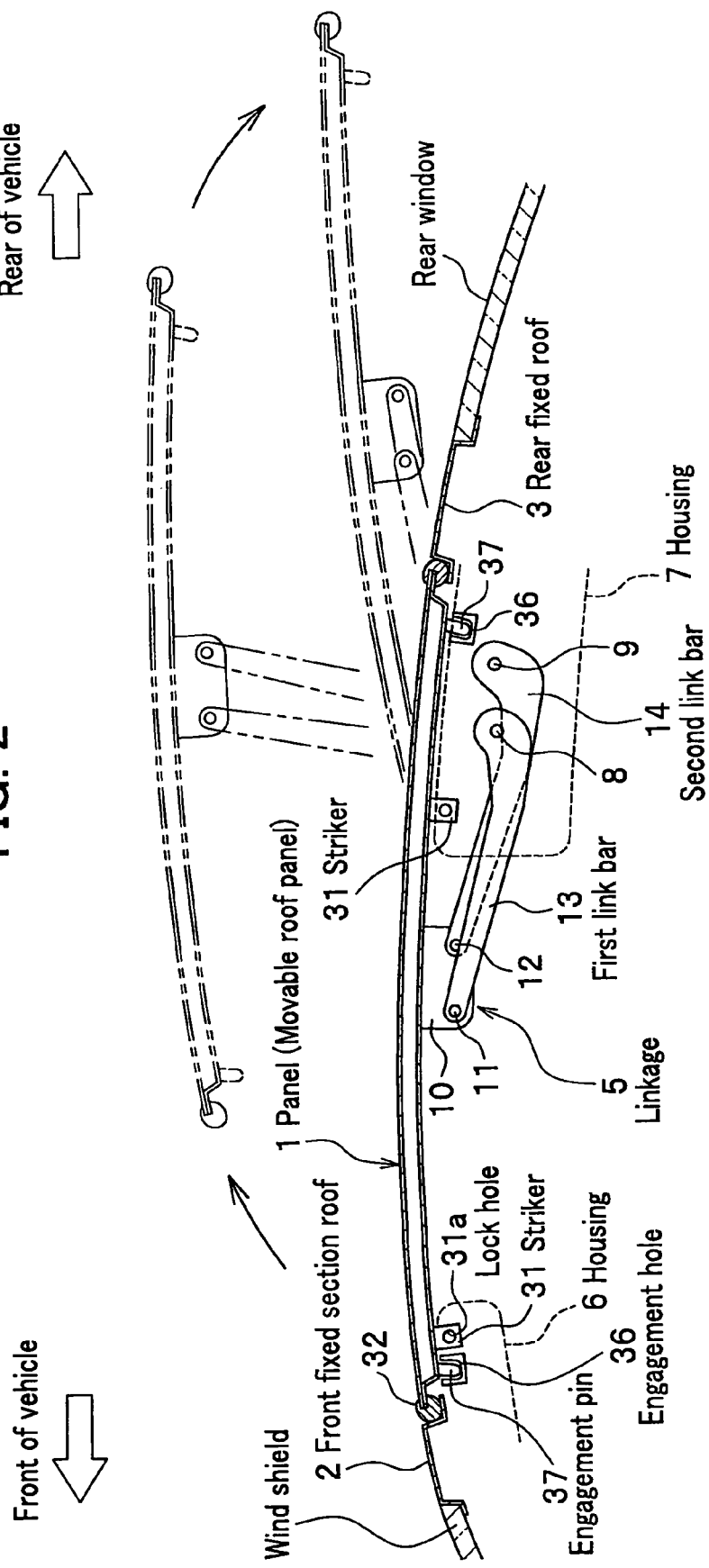
FIG. 2 is a side view for explaining a linkage of opening and closing mechanism of a movable roof.

As shown with solid line in FIG. 2, when panel 1 is entirely closed, the first link bar 13 and the second link bar 14 extend in an anteroposterior direction of the vehicle body with their front portions slightly upward. When connecting shaft 9 is rotated from this state in clockwise direction as shown in FIG. 2 by a driving source (not shown), that is, when the second link bar 14 rotates in clockwise direction around connecting shaft 9, the first link bar 13 rotates in clockwise direction as a driven bar around connecting shaft 8. Therefore, as shown with phantom line, panel 1 rotatably moves up and backward, and when panel 1 is entirely opened, as aforementioned, the front end of panel 1 is located at around a rear periphery of opening 4, resulting in extending in the upper space of rear fixed roof 3 and the rear window.

If the above-mentioned linkage 5 is configured as, so-called, a parallel linkage, it is possible to move panel 1 backward while keeping it in horizontal posture. In addition, an appropriate length of each of the bars is selected to form inequilateral four-bar linkage, which will be explained later in detail, as with the present embodiment, so that panel 1 is moved with rear up when panel 1 is opened. By configuring panel 1 to move with rear up at the opening as described in the above, it is possible to give a roof spoiler function to panel 1.

Figure 3:
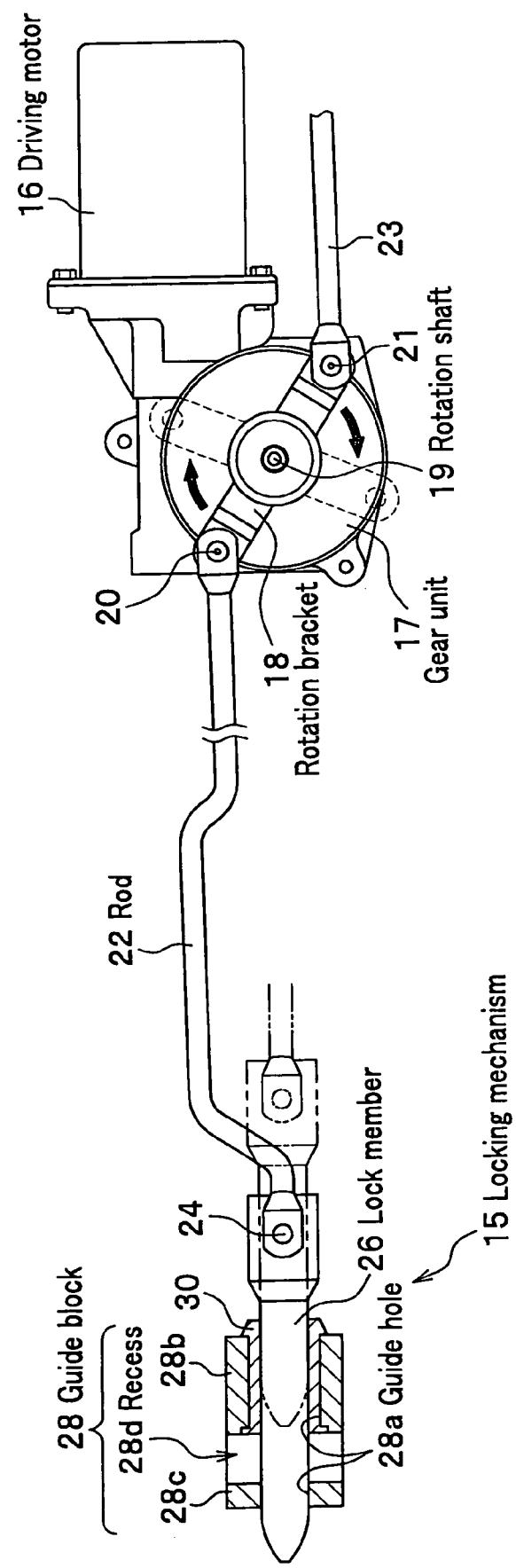
FIG. 3 is a plane cross sectional view for explaining a locking mechanism.
Figure 4:
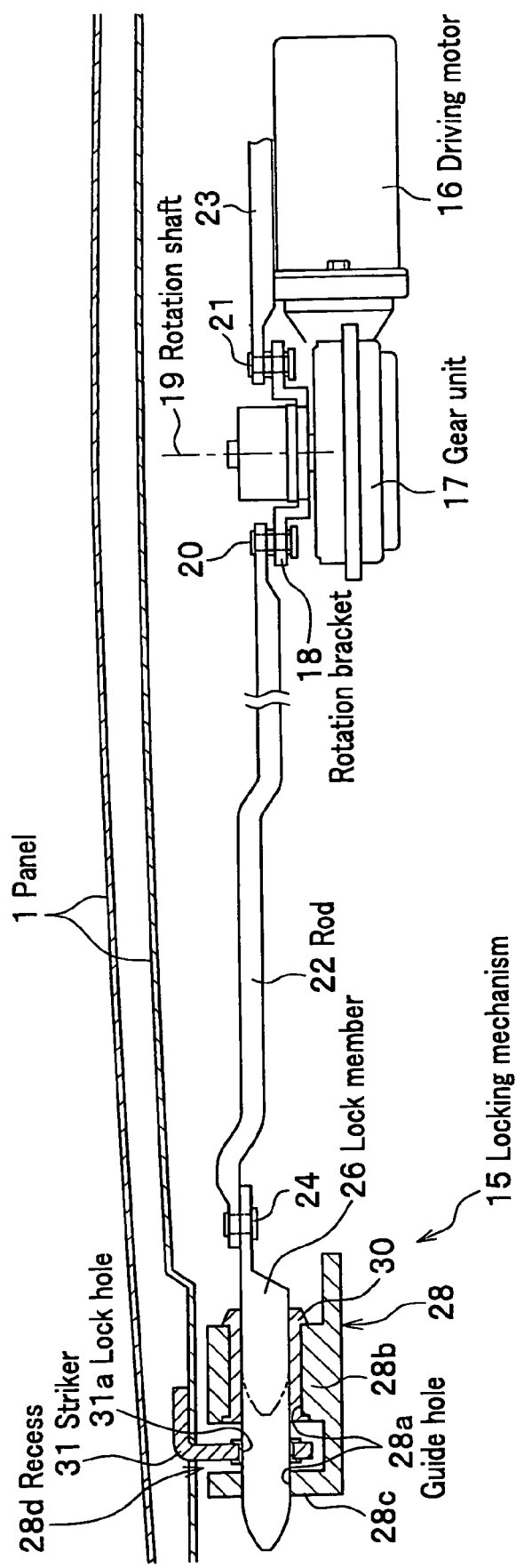
FIG. 4 is a side cross sectional view for explaining a locking mechanism.
Figure 5:
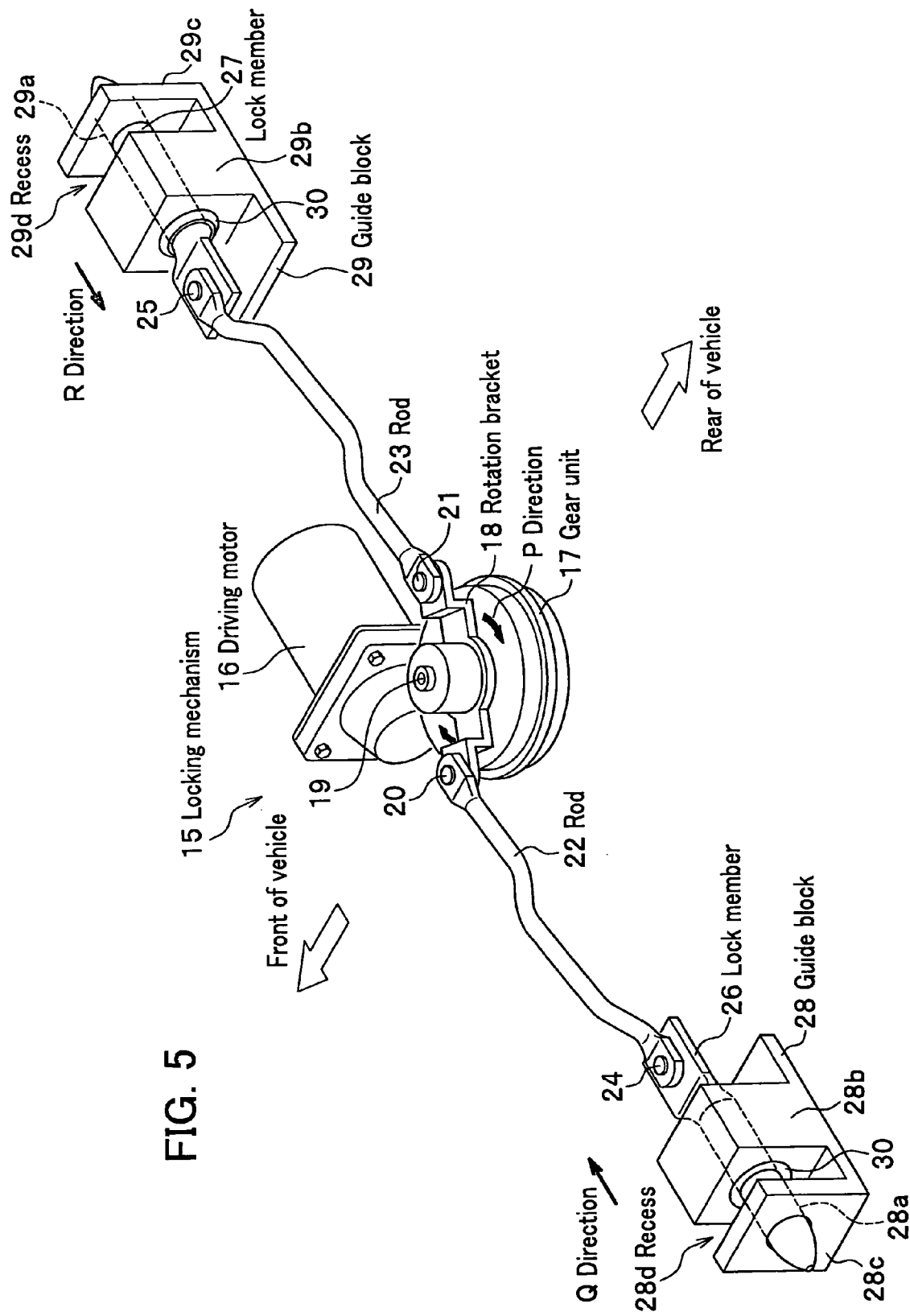
FIG. 5 is an external perspective view of a locking mechanism.

Next, as shown in FIG. 1, locking mechanism 15 is disposed in each housings 6, 7. This locking mechanism 15 is for locking a closed point when panel 1 is entirely closed. Hereinafter, explanation will be made by referring to FIGS. 3 and 5, especially by referring to FIG. 5. FIGS. 3, 4, and 5 are a plane cross sectional view (shown in allow A in FIG. 1), a side cross sectional view (shown in allow B in FIG. 1), and an external perspective view for explaining the locking mechanism.

A symbol 16 shows a driving motor as a driving source of locking mechanism 15. Rotating bracket 18 is configured so that it can reciprocate and rotate with a constant stroke through gear unit 17 by a driving force of motor 16 around rotation shaft 19 having an axis in vertical direction. On rotation bracket 18, connecting shafts 20, 21, each of which has an axis in vertical direction, are arranged at positions opposite rightly 180 degrees to each other against rotation shaft 19. On connecting shafts 20, 21, one end of rods 22, 23 is rotatably attached, respectively.

Rods 22, 23 are arranged and extended to the vehicle width direction, respectively so that the other each end is to be separated to each other. The other each end is rotatably attached to a base of lock members 26, 27 through connecting shafts 24, 25, each of which has an axis in vertical direction. Lock members 26, 27 are a member having substantially a cylindrical shape. Around the end of the member is tapered like the end of bombshell. That is, it has a narrower diameter with reaching to the end. Symbols 28, 29 show fixed guide blocks fixed to the vehicle body, and guide holes 28a, 29a having a hole axis direction in the vehicle width direction are formed on them, respectively. Lock members 26, 27 are supported by guide blocks 28, 29 so that they can move linearly along the vehicle width direction by engaging with guide holes 28a, 29a, respectively. Meanwhile, symbol 30 is a bush attached to guide holes 28a, 29a.

As understood from the aforementioned explanation, rods 22, 23 have a role of con-rod function in which rotation shaft 19 is a rotation center of a crank. When rotation bracket 18 rotates a given stroke, the rotation displacement amount is transferred to a linear displacement amount of lock members 26, 27 through rods 22, 23. Therefore, when rotation bracket 18 rotates in one direction (Q direction, R direction in FIG. 5), lock members 26, 27 move linearly so as to be close to each other, and when it rotates in another direction, lock members 26, 27 move linearly so as to be separate to each other.

Guide blocks 28, 29 have first wall members 28*b*, 29*b* and second wall members 28*c*, 29*c*, each of which rises from a base and is separated to each other in the vehicle width direction. In this configuration, recess 28*d*, which is aligned to the anteroposterior direction of the vehicle and has an opening on the upper side, is formed between the first wall member 28*b* and the second wall member 28*c* of guide block 28. Also, a similar recess 29*d* is formed between the first wall member 29*b* and the second wall member 29*c* of guide block 29. Lock members 26, 27 pass through recesses 28*d*, 29*d* respectively when they are separated to maximum, and the ends of the members protrude to outside in the vehicle width direction from the second wall members 28*c*, 29*c* which are located at the outside of the guide blocks, respectively. On the other hand, when they are mostly close to each other, the ends of the members do not protrude and are located in guide holes 28*a*, 29*a* of the first wall members 28*b*, 29*b* (In FIG. 3 and FIG. 4, a status where the end of the other lock member 26 is located in guide hole 28*a* of the first wall member 28*b* is shown with a phantom line.).

In addition, as shown in FIG. 2, striker 31, which is disposed lock hole 31*a* having a hole direction in the vehicle width direction, is fixed up at four corners on a lower surface of panel 1. When panel 1 is entirely closed, as shown in FIG. 4, striker 31 is located in recess 28*d* (and 29*d* in FIG. 5), and panel 1 is locked to the vehicle body by passing through lock member 26 into lock hole 31*a* of striker 31 by rotation of rotation bracket 18 with driving motor 16. As a result, entire closing of panel 1 is maintained. Also, as shown in FIG. 1, at the four corners under panel 1, engagement pin 37 engaging with engagement hole 36, which is formed at each end in the vehicle width direction of housing members 6, 7, is disposed for determining a position of panel 1 against opening 4 when it is entirely closed.

In the present embodiment, when panel 1 is entirely opened, lock members 26, 27 (FIG. 5) of locking mechanism 15 in the rear housing member 7 shown in FIG. 1 are configured so that they are engaged with striker 31 located at two front corners of panel 1. That is, a single locking mechanism 15 has a configuration to combine the locking function for entirely opening and entirely closing. With this configuration, it becomes possible to lock panel 1 without disposing a specific locking mechanism for the entirely opening, thereby resulting in building of economical locking mechanism 15.

As described in the above, in linkage 5, if, so-called, an inequilateral four-bar linkage is formed by selecting an appropriate length for each bar, panel 1 can be moved so as to gradually rise with rear up, not to move in parallel, for example, with opening of panel 1. According to this embodiment, as briefly described, a spoiler function can be given to panel 1. In addition, since a center of panel 1 at each moment changes in the opening and closing process, a moving trajectory of panel 1 is not simple, but complex, thereby resulting in improvement of design characteristics of opening and closing motion of panel 1.

Hereinafter, two embodiments will be shown as a specific structure of linkage 5.

First Embodiment

In the present embodiment, as briefly described, linkage 5 is configured with an inequilateral four-bar linkage which has a fixed bar (a bar between connecting shafts 8, 9) at a vehicle body side. It is characterized in that an instant center of panel 1 against the vehicle body when panel 1 is at a position of entirely closing has been positioned ahead of a front end of panel 1, or behind of a rear end of panel 1.

Here, as shown in FIG. 2, at a periphery of panel 1, weather stop 32 which is composed of an elastic body such as rubber materials and the like having a role of waterproof function is attached. When panel 1 is entirely closed, this weather stop 32 is elastically deformed to fit with, for example, front fixed section roof 2 and rear fixed roof 3 so that panel 1 engages with opening 4. Since this weather stop 32 is a part of constitutional elements of panel 1, "ahead of a front end of panel 1" and "behind of a rear end of panel 1" mean ahead of weather stop 32 of the front end of panel 1 and behind of weather stop 32 of the rear end of panel 1, respectively. However, this is not true when an element which has a waterproof function is attached, for example, at front fixed section roof 2 side and rear fixed roof 3 side.

FIG. 6 is a view showing a position of an instant center X of panel 1 against the vehicle body when panel 1 is entirely closed. A crossing angle of a bar of a first link bar 13 against the fixed bar between connecting shafts 8, 9 is named $\alpha$, and that of a second link bar 14 is named $\beta$. A crossing point of a line (a line which connects connecting shaft 8 and connecting shaft 11) of the bar of the first linkbar 13 and a line (a line which connects connecting shaft 9 and connecting shaft 12) of the bar of the second link bar 14 is the instant center X of panel 1 against the vehicle body.

Figure 6A:
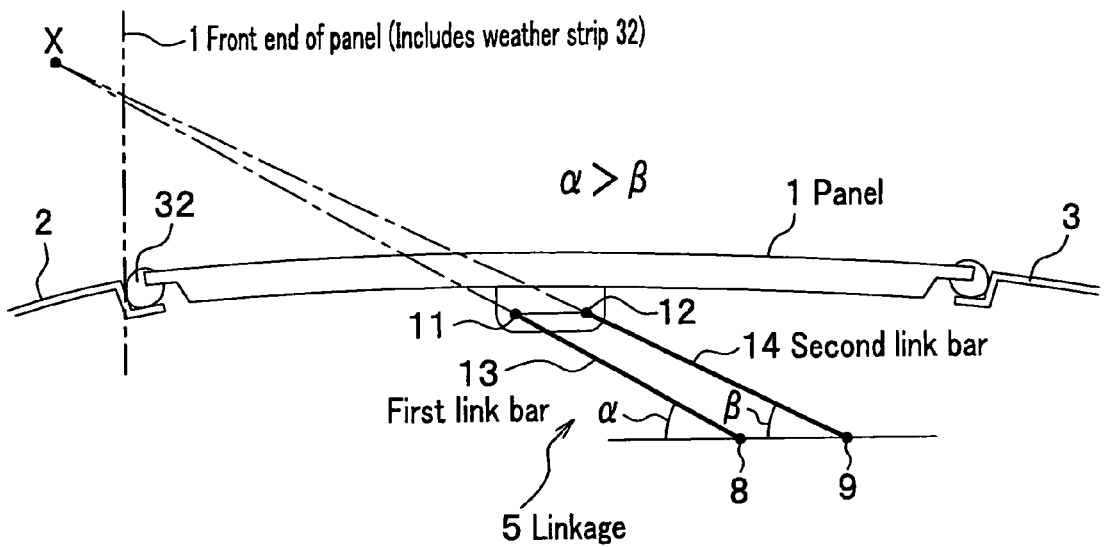
FIG. 6 is a schematic diagram for explaining a linkage according to the first embodiment, and showing a position of an instant center of a movable roof against the vehicle body at entirely opening of the movable roof.
Figure 6B:
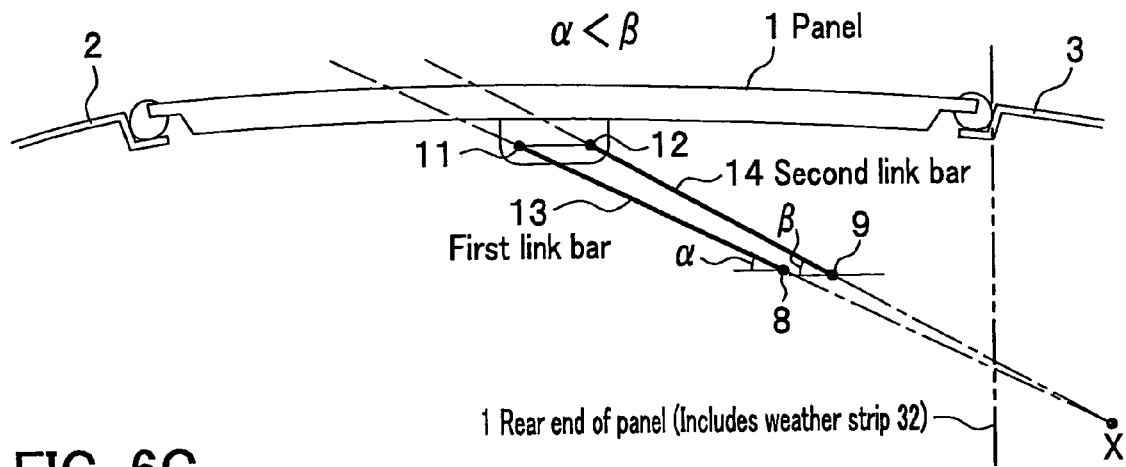

FIG. 6A shows a case where the instant center X is positioned ahead of the front end of panel 1 by setting a relation of $\alpha>\beta$. On the other hand, FIG. 6B shows a case where the instant center X is positioned behind of the rear end of panel 1 by setting a relation of $\alpha<\beta$. Like the above, by positioning the instant center X ahead of the front end of panel 1, or behind of the rear end of panel 1, both of the front end and the rear end of panel 1 can be simultaneously displaced upward at the initial stage of opening of panel 1 which is being at entirely closing. On the other hand, at the final stage of entirely closing of panel 1 which is being opened, it is possible to simultaneously displace downward the both of the front end and the rear end of panel 1.

Namely, when the instant center X is located within a range of panel 1 regarding the anteroposterior direction of the vehicle, displacement directions of the front and the rear ends of panel 1 are inversed regarding the up and down directions. For example, at the initial stage of opening of panel 1, the front end of panel 1 displaces downward, while the rear end displaces upward. In this case, it is likely to happen that an improper force is applied to the front end of panel 1 contacting with front fixed section roof 2.

On the contrary, as with the present invention, if the instant center X is positioned ahead of the front end of panel 1, or behind of the rear end of panel 1, it becomes possible to simultaneously displace the front end and rear end of panel 1 upward or downward. Through this, for example, if an opening and closing structure is configured so that the rear end gradually moves with rear up according to opening of panel 1, it becomes possible to smoothly open and close panel 1 without applying any improper force to the front end and the rear end of panel 1 at the initial stage of opening of panel 1 and at the final stage of closing of panel 1.

Figure 6C:
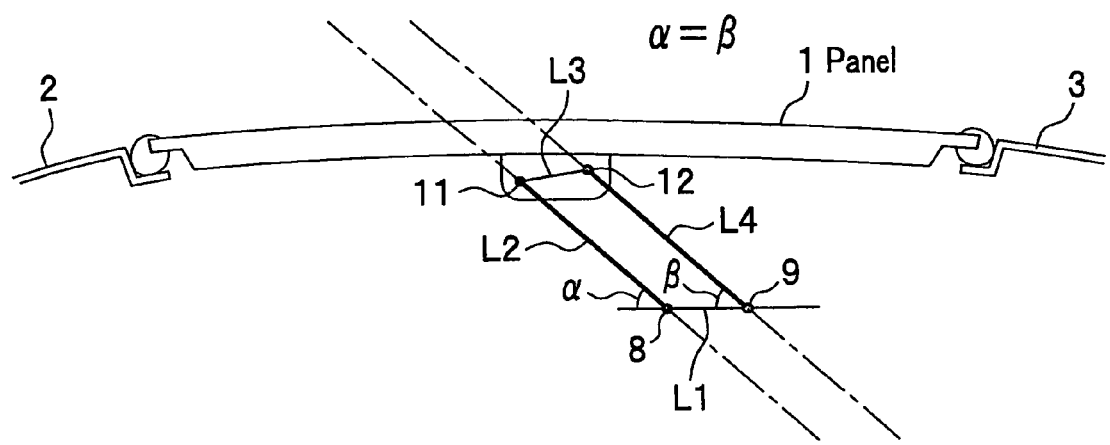

Meanwhile, FIG. 6C shows a case where a relation $\alpha=\beta$ is set, and also relations L1>L3 and L4>L2 are set regarding the distances among the bars (L1: a distance of the fixed bar between connecting shafts 8, 9, L2: a distance of the bar of the first link bar 13, L3: a distance of the bar between connecting shafts 11, 12, L4: a distance of the bar of the second link bar 14). In this case, since $\alpha=\beta$, a crossing point between a line of the bar of the first link bar 13 and a line of the bar of the second link bar 14, that is, the instant center X theoretically does not exist. However, in this case of the present invention, it is supposed that the instant center X exists at infinitely distance from the front end of panel 1, or at infinitely distance from the rear end of panel 1. Therefore, it is also supposed that the case of $\alpha=\beta$ is included in the configuration that "the instant center X is located ahead of the front end of panel 1, or behind of the rear end of panel 1".

In the case of FIG. 6C, since $\alpha=\beta$, at the initial stage of opening of panel 1 and at the final stage of closing of panel 1, the movement becomes similar to that of the parallel linkage. As a result, each displacement direction and each displacement amount of the front end and the rear end of panel 1 are the same to each other. If the inequilateral four-bar linkage is configured so that $\alpha=\beta$ like the above, an improper force is substantially not applied to the front end and the rear end of panel 1, thereby resulting in smooth opening and closing of panel 1. This case in FIG. 6C and the afore mentioned case in FIG. 6a have the best-suited structure for giving a roof spoiler function to panel 1 by making it with rear up at the opening.

As understood from the above explanation, in the present embodiment, a difference between $\alpha$ and $\beta$ is set to be small (including $\alpha=\beta$) so that the instant center X is positioned ahead of the front end of panel 1, or behind of the rear end of panel 1. Regarding layouts and shapes, and the number of pieces and the like which are related to each constitutional element are not limited to the ones described in the drawings, provided they contain spirit and scope of the present embodiment.

Second Embodiment

Figure 7:
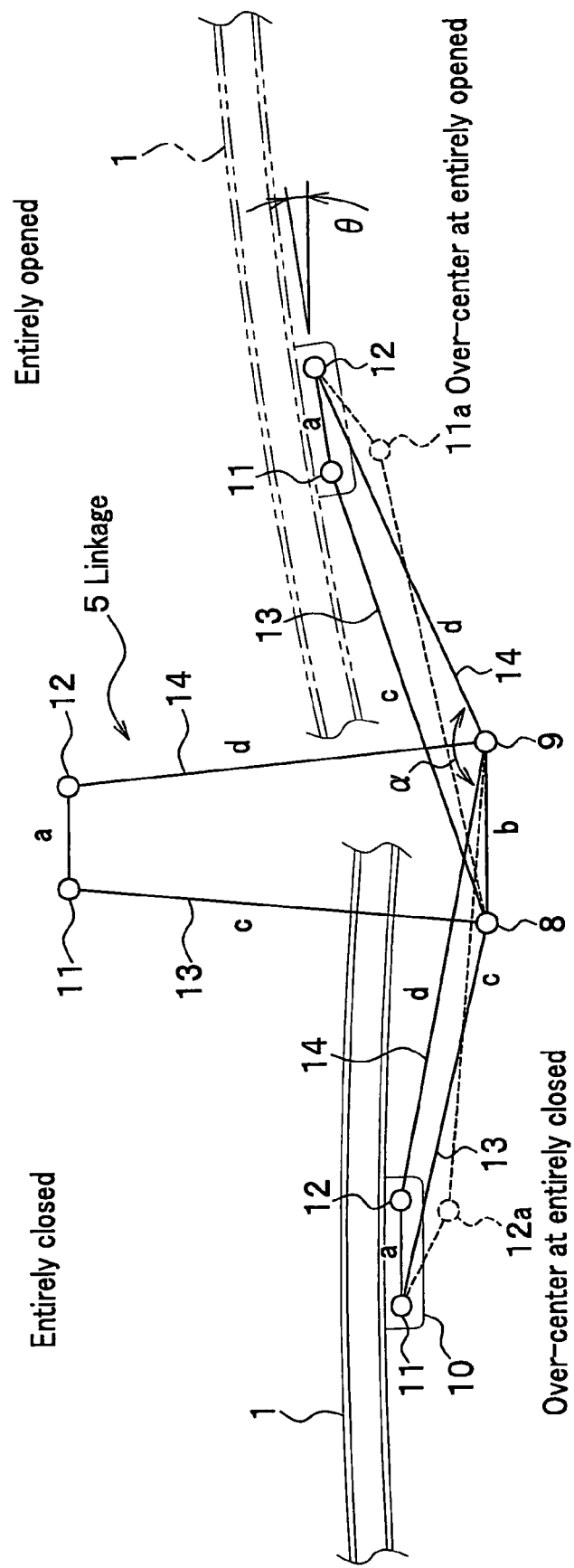
FIG. 7 is a view for explaining a model of linkage 5 according to the second embodiment.

FIG. 7 is a schematic diagram of a model of linkage 5 according to a second embodiment. As afore mentioned, linkage 5 has bars which include a line segment between connecting shafts 8. 9, a first link bar 13, a line segment between connecting shafts 11, 12, and a second link bar 14, and an inequilateral four-bar linkage is configured with the them, in which a line segment between connecting shafts 8, 9 is set as a fixed bar. In FIG. 7, a link status shown in the left side against the line segment between connecting shafts 8, 9 of fixed bar shows the status of entirely closing of panel 1, and the link status shown in the right side shows the status of entirely opening of panel 1. A distance between connecting shafts 11, 12 is a bar length a at a movable roof side. A distance between connecting shafts 8, 9 is a fixed bar length b. A distance between connecting shafts 8, 11 is a bar length c of a first link bar 13. A distance between connecting shafts 9, 12 is a bar length d of a second link bar 14.

The each bar length is set first as a<b, then, the bar length a between connecting shafts 11, 12 is shorter than that of the fixed bar length b. By setting the relation like the above, it is possible to prevent from lowering of the rear part of panel 1 when panel 1 is entirely opened, and give the spoiler function by lifting up the rear part.

In addition, a relation (a+d)>(b+c) is set. By setting this relation, when panel 1 is reached to a position of entirely closing as shown in FIG. 7, a position of connecting shaft 12 is set so that it does not cause an over-center. The over-center means that the position of connecting shaft 12 goes beyond a position (death point) where a line segment which connects connecting shafts 11, 12 and a line segment which connects connecting shafts 9, 12 are in straight line. It is such a position of connecting shaft 12a as shown with dotted line in FIG. 7. If the over-center has happened by some reason, connecting shaft 12 is not able to go beyond the death point, then, linkage 5 becomes not to operate any more.

Therefore, by setting the relation (a+d)>(b+c) regarding the bar length, it is possible to prevent from stopping operation of linkage 5, thereby resulting in smooth opening and closing operation of panel 1. Meanwhile, if a relation (a+d)≦(b+c) is set, there is a possibility to cause the over-center of connecting shaft 12. Since the over-center at entirely closing of panel 1 can be avoided by setting conditions of each bar length, it is not necessary to equip with an extra stopper unit at vehicle body side for controlling the movement of the linkage at entirely closing. As a result, it is possible to secure the reliability with a simple structure.

Further, a relation (a+c)>(b+d) is set. By setting the relation like this, as with the case of entirely closing, a position of connecting shaft 11 is set so that it does not cause the over-center when panel 1 is reached to a position of entirely opening as shown in FIG. 7. The over-center at entirely opening means that the position of connecting shaft 11 goes beyond a position (death point) where a line segment which connects connecting shafts 8, 11 and a line segment which connects connecting shafts 11, 12 are in straight line. It is such a position of connecting shaft 11a as shown with dotted line in FIG. 7. If a relation (a+c)≦(b+d) is set, as shown with dotted line in FIG. 7, connecting shaft 11 goes beyond the over-center, resulting in a position of connecting shaft 11a. As a result, linkage becomes not to operate.

Therefore, by setting the relation (a+c)>(b+d) regarding the bar length, as with the explanation of the entirely closing, it is possible to prevent the over-center at the entirely opening of panel 1, thereby resulting in smooth opening and closing operation of panel 1. In addition, since the over-center can be avoided by setting conditions of each bar length, it is not necessary to equip with an extra stopper unit at vehicle body side for controlling the movement of the linkage at entirely opening. As a result, it is possible to secure the reliability with a simple structure.

By changing a relation between length c, which is the distance between connecting shafts 8, 11 of the first linkbar 13, and length d, which is the distance between connecting shafts 9, 12 of the second link bar 14, it is possible to arbitrarily set a rear part tilt angle $\theta$ at entirely opening of panel 1. For example, if the relation is set so that length c is shorter than length d, the rear part tilt angle $\theta$ at entirely opening becomes larger. The rear part tilt angle changes any time according to the opening operation of panel 1, and finally reaches to the rear part tilt angle $\theta$ at entirely opening, thereby resulting in achieving a spoiler function.

In addition, the rear part tilt angle $\theta$ can be increased at entirely opening according to an increase of a driving angle $\alpha$, which is the driving angle from entirely closing to entirely opening of the second link bar 14 as the driving bar.

Meanwhile, housing 7, in which a unit for generating the driving force is set, can be arranged at a higher position close to the roof according to the increase of the driving angle $\alpha$. As a result, a large indoor space can be secured. Therefore, the driving angle $\alpha$ is favorable to be close to 180 degrees.

The present invention is not limited to the embodiments described in the above. Various modifications are possible without departing from the spirit of the present invention. For example, the number of linkage 5 and the arrangement thereof, each number of linkbars 13, 14 composing the linkage 5 and the arrangement thereof are not limited to the ones described in the drawings.

What is claimed is:

1. A movable roof opening-closing structure rotatively opening and closing a movable roof toward backward at an outside of a vehicle body through a linkage equipped with a set of a first link bar and a second link bar, the set of the first link bar and the second link bar being operably coupled at a vehicle body side and at a movable roof side within an inner periphery of an opening of the movable roof, wherein the linkage is configured with a four-bar linkage having a fixed bar at the vehicle body side and a bar at the moveable roof side, such bars being of unequal lengths, and wherein an instant center of the movable roof against the vehicle body when the movable roof is at an entirely closing position is located at one of positions that is ahead of a front end of the movable roof and behind of a rear end of the movable roof.

2. A movable roof opening-closing structure according to claim 1, wherein a tilt angle of a bar of the first link bar and a tilt angle of a bar of the second link bar against the fixed bar are set equal to each other when the movable roof is at an entirely closing position.

3. A movable roof opening-closing structure rotatively opening and closing a movable roof toward backward at an outside of a vehicle body through a linkage equipped with a first link bar and a second link bar, wherein the linkage is configured with a four-bar linkage having a fixed bar at a vehicle body side and a bar at the moveable roof side, such bars being of unequal lengths, and wherein the following relations are satisfied, $a<b$, and $(a+d)>(b+c)$, and $(a+c)>(b+d)$ among a, b, c, and d, when a length of a bar at the movable roof side is a, a length of the fixed bar is b, a length of the first link bar is c, and a length of the second link bar is d.

4. A movable roof opening-closing structure according to claim 3, wherein the fixed bar is disposed at a roof periphery of the vehicle body in substantially horizontal direction.

* * * * *